Dec. 29, 1964   A. J. MILLER   3,163,080
FIBER OPTICS FILM PRINTING SYSTEMS
Filed Oct. 17, 1961   3 Sheets-Sheet 1
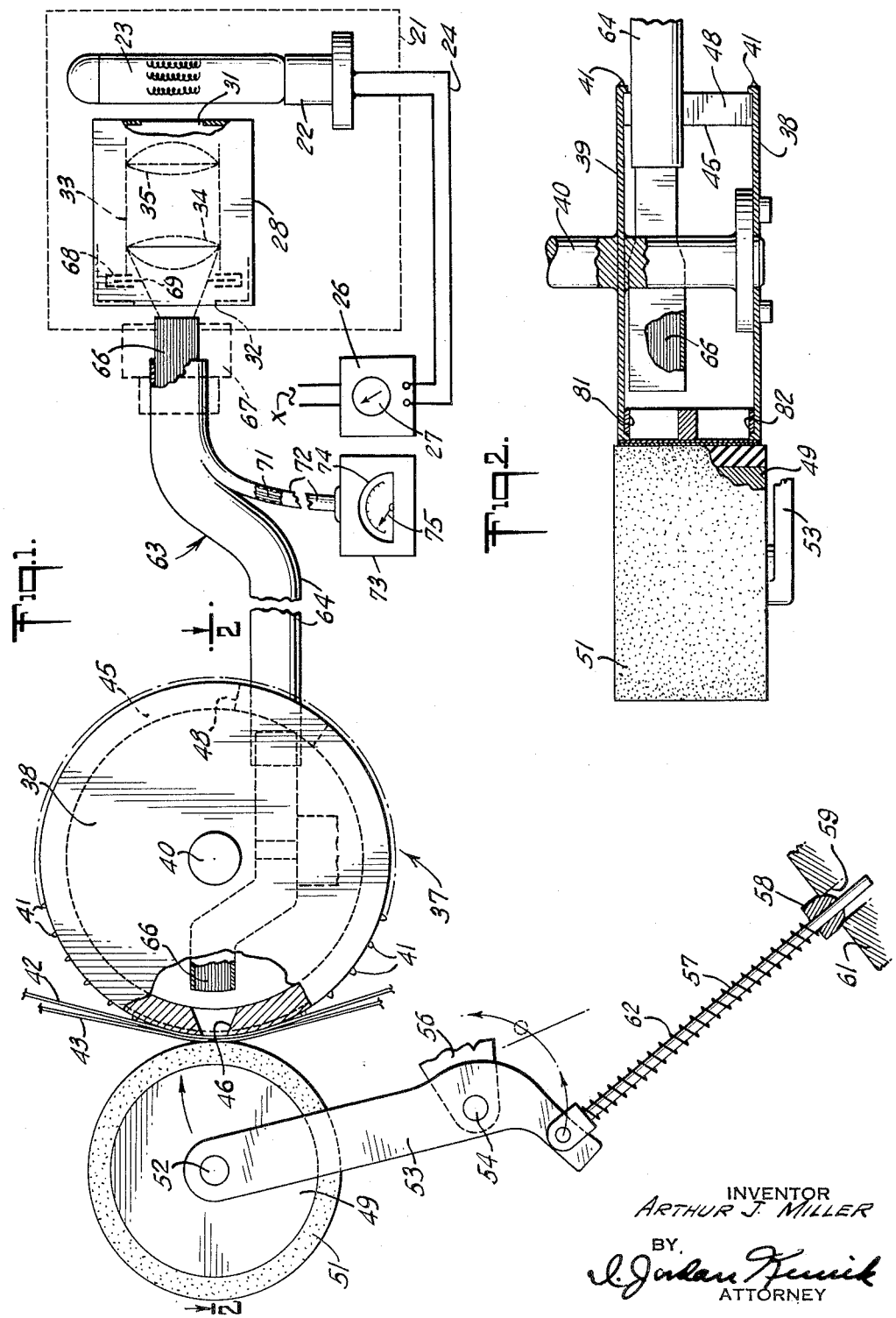
INVENTOR
ARTHUR J. MILLER
BY
ATTORNEY

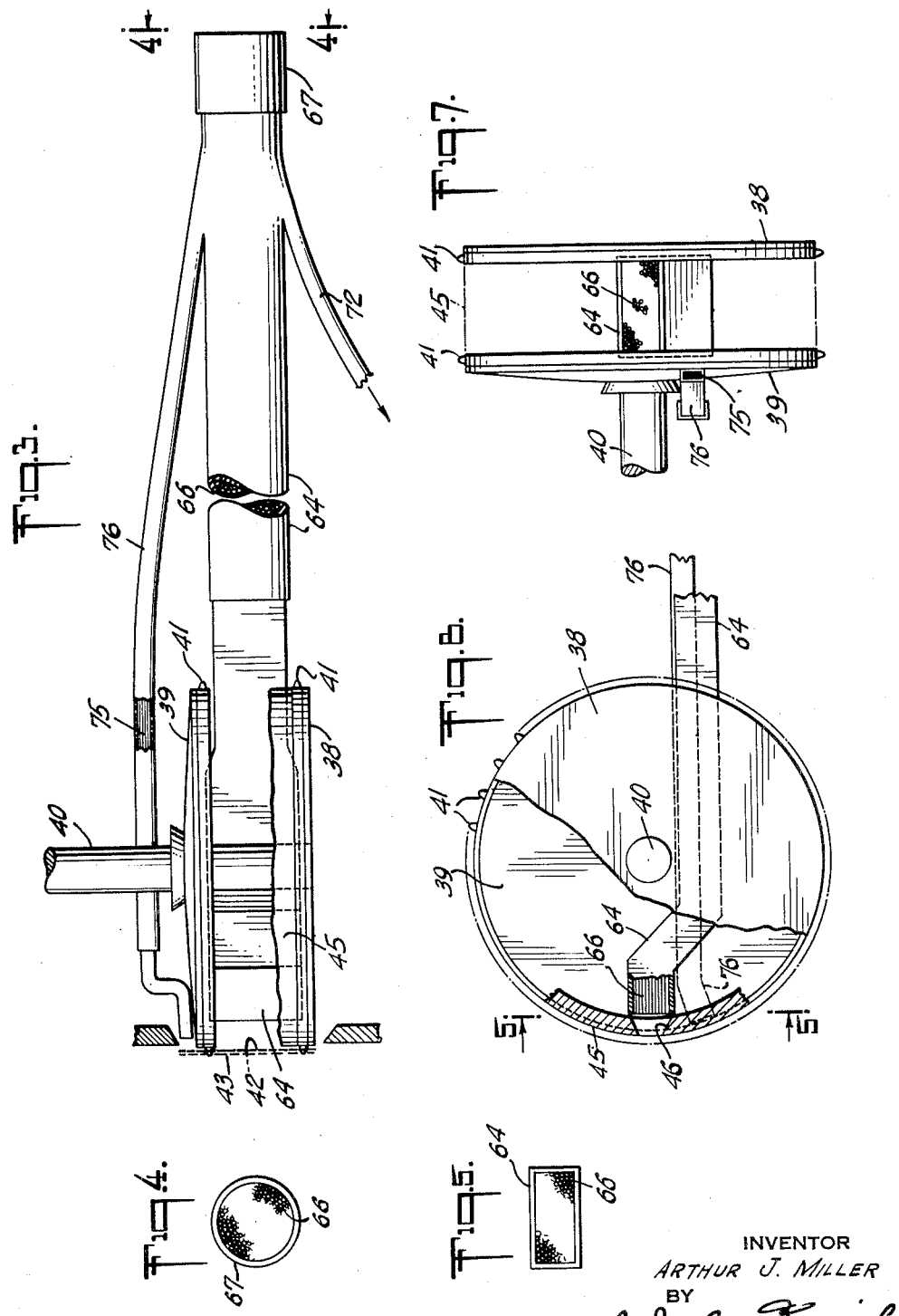

United States Patent Office 3,163,080
Patented Dec. 29, 1964

3,163,080
FIBER OPTICS FILM PRINTING SYSTEMS
Arthur J. Miller, Haworth, N.J., assignor to Du Art Film Laboratories, Inc., New York, N.Y., a corporation of New York
Filed Oct. 17, 1961, Ser. No. 145,686
21 Claims. (Cl. 88—24)

This invention relates to film printing and viewing systems or the like, and more particularly to an improved fiber optics means for transmitting light from a light source to a film printing, viewing or projecting location, and for controlling the light output of said transmission means in accordance with the desired conditions of uniformity of illumination and of image contrast control.

In previous motion picture film printing apparatus, it has been found that serious disadvantages have been encountered because of the necessity of providing a good source of light close to the location where contact printing takes place between two contiguous strips of film. The placing of the lamp and necessary optical system associated therewith in the cramped quarters of the film transport mechanism involved intricate and complex mounting and wiring problems while at the same time the intense heat generated by the lamp produced deleterious effects not only upon the moving mechanical parts, but also upon the film that was being processed.

Furthermore, where continuous motion picture film processing took place requiring complex mechanical transport equipment which underwent considerable vibration, such mechanical agitation redounded disadvantageously to the lamp itself and its mounting, thereby shortening the lamp life and involving considerable down-time for mechanical and electrical repairs.

Another disadvantage encountered in previous film printing and viewing apparatus is the lack of uniformity of illumination over the whole of the printing aperture or of the viewing field, as well as the complexity of apparatus necessary to control the quality of the light by varying its characteristics from specular through various degrees of diffusion when optimum contrast control is desired.

The foregoing disadvantages have been eliminated in accordance with the present invention wherein the light source has been removed, in one embodiment, to a location remote from the film transport and printing mechanisms. Utilization is made of a flexible cable of optical fibers, one end of which is connected to the light source and the other end of which is mounted adjacent the film transport mechanism in a location where it projects the printing light toward the film. By this means, the vibrations of the film transport and printing mechanisms are absorbed in the flexible cable and do not reach the light source in the lamp housing which may be rigidly mounted on a platform or wall. Accordingly, lamp life is considerably extended and film processing is now infrequently interrupted.

Another advantage realized by the system embraced by the present invention is the removal of the high intensity heat from proximity to the film transport mechanism whereby the film printing process takes place under greatly improved and comparatively cool conditions.

A further advantage inherent in the present invention lies in the modification of the fiber optics bundle whereby a branch portion may be split out therefrom and connected to a photometer to monitor the amount of light projected towards the film printing location of the apparatus. In conjunction with the photometer, a potentiometer may be inserted into the lamp circuit, or other electrical or mechanical means may be used, to control and determine the desired amount of light that is to be utilized for the printing process.

Additionally, another branch portion of the fiber optics bundle may be split out from the main bundle to project a separate beam of light upon the edge portion only of the film in order to print or reproduce key numbers or coded information as may be desired or required.

An important advantage of the fiber optics light transmission means lies in its ability to project light uniformly throughout the entire printing aperture or upon the whole viewing field. Also by the use of the fiber optics for transmitting light from a source to a printing aperture or viewing field, it is possible by very simple and convenient means to control the characteristics of the light that is being utilized. By suitable means combined with the fiber optics cable, it is possible to control the light output of the cable as to its condition of specularity or degree of diffusion, in order to obtain the optimum or desired contrast control of the image to be produced by the apparatus.

Still other objects and advantages of the invention will be apparent from the specification.

The features of novelty which are believed to be characteristic of the invention are set forth herein and will best be understood, both as to their fundamental principles and as to their particular embodiments, by reference to the specification and accompanying drawings, in which:

FIGURE 1 is a diagrammatic side view, partly broken away and partly in outline, showing one embodiment of the present invention;

FIG. 2 is a fragmentary view, taken on line 2—2 of FIG. 1, some parts being shown in top plan view;

FIG. 3 is a top view similar to FIG. 1 showing another embodiment of the apparatus, some parts being omitted, and some parts being shown in dotted outline;

FIG. 4 is a section view, taken on line 4—4 of FIG. 3, showing the input end of the fiber optics cable;

FIG. 5 is a view taken on line 5—5 of FIG. 6, some parts being omitted in order to show the output end of the fiber optics cable;

FIG. 6 is a fragmentary side view of a portion of the apparatus shown in FIG. 3, some parts being shown in section and others in dotted outline;

FIG. 7 is an end view of the apparatus shown in FIG. 6;

Figure 8:
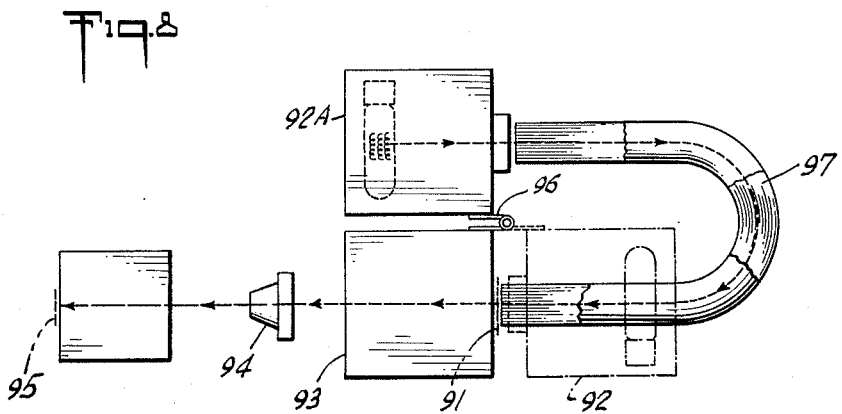
FIG. 8 is a diagrammatic top view showing another embodiment of the invention adapted for use in projection printing.

Referring now to the drawings in detail, one form of the invention is shown in FIG. 1, and comprises a light-tight lamp housing 21 which contains a socket 22 in which is mounted a lamp 23 of a suitable wattage. Socket 22 is connected to a suitable source of power X by way of cable 24 that extends through the wall of housing 21 by means of a suitably light-tight seal. Connected to cable 24 is a variable resistor, potentiometer or rheostat 26 which has a manually operable control knob 27 which is rotatably adjusted to control the amount of power which is transmitted from source X to lamp 23.

Positioned within housing 21 is a lens box 28 having an inlet aperture 31 and an outlet aperture 32 in opposite end walls thereof. Mounted between apertures 31 and 32 is a lens system 33 for receiving light from lamp 23 through aperture 31 and transmitting it through aperture 32. Lens system 33 may comprise a pair of spaced apart lenses 34 and 35 which, in combination, act as a light condenser whose functions will be described in detail hereinbelow.

Positioned some distance apart from lamp housing 21 is a sprocket wheel assembly, generally designated 37, comprising a pair of spaced apart parallel discs 38 and 39 mounted rotatably on spindle 40. (See also FIGS.

3, 6 and 7.) The perimeter of either or both of discs 38 and 39 has a plurality of spaced apart sprockets 41, which are adapted to engage sprocket holes in motion picture film strips 42 and 43.

Positioned between discs 38 and 39 is a stationary annular frame 45 having a light-transmitting aperture 46 in the area where film strips 42 and 43 are traverse tangentially of discs 38 and 39. Frame 45 also has a second aperture 48 through which the fiber optics cable extends, as will be described hereinbelow.

In order to maintain said strips 42 and 43 in contact with each other and against collar 45 opposite aperture 46, there is provided a pressure roller 49 having a resilient peripheral ring 51 made of rubber or the like, which is normally urged against said strips as they pass over and across aperture 46. Pressure roller 49 is freely rotatably mounted on spindle 52 connected to one end of a bell crank 53 which is pivotally mounted on pin 54 positioned in bracket 56. Pivotally connected to the other end of bell crank 53 is one end of a push rod 57 whose shank is movable slidably through a guide block 58 positioned over the mouth of an aperture 59 in a base 61.

Positioned around push rod 57 is a compression spring 62, one end of which urges against a shoulder at one end of said rod and against guide block 58, whereby bell crank 53 normally causes roller 49 to be yieldably urged against film strips 42 and 43, as shown in FIG. 1. Roller 49 may be retracted against the action of spring 62 as desired when film strips 42 and 43 are inserted into or removed from the apparatus herein. Bracket 56 is suitably connected in a fixed position to a stationary frame (not shown) to which base 61 may also be connected.

Lamp housing 21 is spaced a considerable distance apart from the motion picture film printing machine which is subject to vibrations produced by the transport mechanisms operating the take-up and supply reels and their associated apparatus. Lamp housing 21 may be mounted on an isolated platform or bench, or may be attached to a wall which does not receive any vibrations from the film printing machine.

In order to transmit light from lamp housing 21 to and through the light transmitting aperture 46 on frame 45, there is utilized a flexible cable, generally designated 63, which comprises a suitably flexible metallic or plastic tube or sheath 64, or the like, which contains a bundle of intimately grouped light-conducting fibers 66.

Fibers 66 are each made of glass which, in one embodiment, are approximately .004″ in diameter. Each of said fibers consists of a core portion of light-conducting material such as glass or plastic, or the like, which has a relatively high index of refraction. Intimately connected to each core is a thin outer coating or sheath of a similar material which has a relatively low index of refraction. The sheath prevents the loss of light from each core, thereby resulting in high efficiency of light transmission from one end of the fiber to the other.

If, however, a ray of light enters the end of the fiber at too steep an angle, it may nevertheless escape through the low refractive sheath. Accordingly, in one embodiment of a certain type of glass that is utilized, the maximum flexible angle of entry is 34° from the fiber face or a total cone angle of 68°. In practice, therefore, the entrance angle of the cone of light may be limited to a maximum of 60°.

The input end of cable 63 is positioned on the interior of lamp housing 21 and is located a short distance from the exit aperture 32 of lens box 28. The input end portion of cable 63 is connected to lamp housing 21 by means of a light-tight adapter ring 67 which prevents any leakage of light from said housing. The input end of cable 63 may be circular in shape as shown in FIG. 4, and the exposed input ends of fibers 66 receive light from lamp 23 for transmission to the output end of said cable.

Since the input end of the fiber optics bundle is bound in a circular arrangement, this permits the use of standard type condenser lenses to transmit light from lamp 23 and to fill said bundle with light. The output end of the fiber optics bundle may be oblong in shape, as shown in FIG. 5, which conforms with the oblong shape of printing aperture 46. In some embodiments the output end of the fiber optics bundle may also be circular in shape provided its diameter is at least coextensive or greater than the diagonal dimension of aperture 46. The output end portion of the fiber optics bundle is mounted rigidly in a suitable position by attaching it to the interior of the stationary frame ring 45 by means of brackets, bolts or the like (not shown). Because of its flexibility, the fiber optics bundle and its sheath may be bent and curved through the intricate and complex mechanisms of the film printing machine so that its output end is brought to the proper position for conducting light to the printing aperture and projecting it toward the two film strips 42 and 43.

The bundle of fibers 66, as utilized herein, is known as an "incoherent" bundle in which the fibers are mixed and do not have any definite relationship to one another at either end or throughout the cable. In contrast to the "coherent" type of bundle where the fibers are systematically arranged in equivalent uniform patterns at both ends so that an image can be transmitted with integrity through the bundle, the use here of an "incoherent" bundle is particularly advantageous where the transmission of light from the lamp housing to the printing aperture is required. The utilization of an incoherent bundle makes possible the formation of a circular input end for receiving the optimum amount of light from lamp housing 23, while the output end of the fiber assembly may be shaped to conform to the contour of the printing aperture.

Another advantage that is obtained by the use of the fiber optics bundle resides in the fact that the fibers are completely mixed in the bundle resulting in an excellent uniformity of field of illumination. Since the fibers from the various areas at the input end are distributed in uniform random array over the entire area at the output end, such phenomena as center hot spots and edge fall off encountered in other lighting systems are eliminated. Since all of the light impinging upon the input end of the fiber bundle is utilized in the aperture except for slight end losses, the efficiency of this light transmission system is quite high.

A further advantage of the light-transmitting fiber bundle system that is of particular importance in film printing is the control of diffusion of the printing light. The angle of the light cone emerging from each fiber approximates the angle at which it entered. By controlling this cone angle through the appropriate selection of relay condensers in lens box 28, the light can be made to enter the input end of the fiber bundle at a relatively small angle, and by placing the output end of the bundle very close to the film, practically specular light can be obtained.

By increasing the angle of entry of the light cone to approximately 60° and slightly increasing the distance between the output end of the fiber bundle and the film, diffused light can be obtained for the film printing operation because of the many overlapping cones of light emerging from the individual fibers. By variation of the conditions between the specular light and diffused light, considerable control over the printing operation can be exercised. With some types of film, specular light may be desirable. When, however, negatives, which have been worn or handled extensively are to be reproduced, minor negative blemishes and scratches, particularly on the support side, may be minimized by the use of diffused light. In previous systems for obtaining diffused light, considerable loss or wastage of light is encountered because of the interposition of frosted glass plates or the like between the light source and the film. It has been found by experience that the fiber bundle method of producing diffused light actually results in an increase in total light output.

In the film printing or viewing art, it is well known that the contrast of the printed image may frequently be altered depending upon the specularity or degree of diffusion of light from the light source. The degree of this contrast control is, to some extent, dependent upon the amount of diffusion inherent in the image forming material. Therefore, where film is susceptible to this type of contrast control, the angle of entry of the light cone into the input end of the fiber optics bundle may be varied or regulated whereby the specularity or the diffusion of the printing or viewing light is concomitantly modified; by this means it is possible, within certain limits, to control the contrast of the printed or viewed image.

The foregoing controls may be achieved by providing different replaceable lens systems 33 in lens box 28. One lens system may be selected for projecting a substantially parallel or specular beam of light from lamp 23 to the input end of fiber optics 66 whereby specular light is projected from the output end of the fiber optics cable. Other selected lens systems 33 can provide various desired gradations of diffused light as required by the particular film printing or viewing conditions. By this convenient means complete control over the film printing process is facilitated in contrast to the necessity, in previous systems, for the utilization of ground glass for diffusion, or condensing lenses to produce specular light, all of which apparatus had to be in very close proximity to the printing aperture and in a direct line from the light source.

Contrast control may also be achieved by the interposition of a diaphragm component suitably mounted between lens system 33 and the input end of the bundle of fiber optics 66 as shown diagrammatically in FIG. 1. One typical diaphragm, as is well known in the art, constitutes a diaphragm case 68 within which is mounted a diaphragm 69 having a variable aperture. By increasing or decreasing the diameter of the diaphragm aperture the angle of entry of the cone of light transmitted through lens system 33 may be varied accordingly. At a particular aperture opening, a substantially parallel beam of light will be transmitted to the input end of the cable of optical fibers. Suitable accommodation can be made in the character of lens system 33, the size of the aperture of diaphragm 69, and their respective distances from the input end of the optical fibers 66 to produce the desired light output.

In some embodiments of the apparatus described herein, the number of fibers 66 at the input end of cable 64 may be in excess of the number of the fibers at the output end at the printing aperture. These extra fibers which may constitute, in one embodiment, approximately fifteen percent of the total, can be split out of the handle into an auxiliary or branched fiber bundle 71 in auxiliary cable 72, the output end of which is connected to a photometer 73 which can be utilized to monitor the amount of light from lamp 23 being used in the printing operation and to indicate any malfunctioning of the lamp or other light controlled equipment. The dial 74 on the photometer may be suitably calibrated for the movable indicating needle 75 whereby the operator of the apparatus can adjust the amount of light necessary for optimum printing conditions to be transmitted to the printing aperture by rotating and setting control knob 27 on rheostat 26.

Instead of utilizing rheostat 26, the amount of light conducted by lens system 33 from lamp 23 to the input end of the fiber optics bundle may be controlled or varied by the utilization of a device similar to diaphragm 69, or other suitable means incorporated into or associated with lens system 33, in order to control the quantity of light that is to be produced at the output end of the fiber optics bundle.

In some embodiments, the auxiliary cable 72 of fiber optics bundle 71 may constitute an integral cable separate from cable 64. In such event, the input end of cable 72 would be co-terminous with the input end of cable 64 and would measure or monitor the light transmitted by cable 64 by analogue control, in the same manner as described hereinabove.

In another embodiment as exemplified in FIG. 3, another surplus group of fibers 75 may be split out of the input end of cable 64 into an auxiliary branched cable 76, with the output end thereof being positioned adjacent and facing the side end portion of printing aperture 46 externally of disc 39.

It will be noted in FIG. 3 that film strips 42 and 43 extend past disc 39 so that the edge portions thereof are positioned opposite the output end of cable 76. By this means, the auxiliary beam of light emanating from cable 76 may be utilized for printing code insignia or key numbers on the edge of positive film strip 43 in accordance with those previously printed on negative film strip 42.

Furthermore, other kinds of information on the marginal edge of film strip 42 which transmits light from the output of cable 76 may be sensed by suitable auxiliary apparatus for controlling either the intensity or the character of the light input to cable 64, or to control other film processing apparatus utilized in conjunction with the film printing machine.

It is understood, of course, that when auxiliary bundles of fibers are split out from the principal cable 64, the input end of the cable will be sufficiently large to collect the requisite amount of light not only for said auxiliary cables, but also will leave a sufficient quantity of fibers 66 to adequately fill the area opposite printing aperture 46.

In the embodiment of FIGS. 1 and 2, the apparatus is adapted for the printing of 16 mm. film, for example, where frame 45 is provided with a pair of separated printing apertures 81 and 82 arrayed side by side. One cable 64 is shown supplying light for printing aperture 81 only, where a pair of contiguous 16 mm. strips of film are transported past said aperture 81. It is evident that in the apparatus shown in FIG. 2, a second cable 64 adjacent the first one may also be suitably mounted and be connected to supply light for printing aperture 82 also, whereby two separate pairs of 16 mm. film may be processed simultaneously.

In the embodiment of the apparatus shown in FIG. 3, unitary cable 64 provides illumination for a single printing aperture 46 which spans the whole picture frame breadth of film strips 42 and 43. It is understood that the space between discs 38 and 39 is suitably dimensioned for the particular width of film that is to be processed.

While the utilization of fiber optics has been described hereinabove in embodiments for contact printing of motion picture film and the like, the fiber optics light transmission system may also be utilized in conjunction with projection printing of motion picture film, as diagrammatically illustrated in FIGS. 8 and 9.

In the conventional projection printing apparatus, 35 mm. film 91 passes between a lamp housing 92 and a lens box 93, the latter containing the conventional condensing lens system, whereby the image is projected through a reducing lens 94 to impinge upon unexposed 16 mm. film 95. In the conventional longitudinal array as shown in FIG. 8, it has been found that excessive heat from lamp housing 92 is somewhat deleterious to the strip of film 91 that passes across the light aperture. Accordingly, this apparatus is modified by mounting lamp housing 92, originally shown in dotted outline, upon a hinge bracket 96 whereby it is swung into the 92A position and is spaced apart from film 91. A bundle of optical fibers 97 is then connected at one end to the outlet aperturer of the lamp housing 92A, and at its other end to a position adjacent film strip 91.

In the illustration of FIG. 8, the bundle of optical fibers is shown without its sheath and without the mounting brackets or adapter rings for connection to the lamp housing. It is understood that in the in-line longitudinal array of the conventional system with lamp housing 92 aligned with the other components, the bundle of optical fibers 97 was not included. It is only when lamp housing 92 assumes the position of 92A that bundle 97 is connected in the system. By the means shown in FIGS. 8 and 9, the arrangement for placing a hot light source at a distance from the film by the utilization of a flexible light coupling for transmitting light to the operating location greatly improves the process of projection printing. Equally important are the advantages obtained achieving uniform illumination throughout the image area as well as improved contrast control as described hereinabove.

Figure 9:
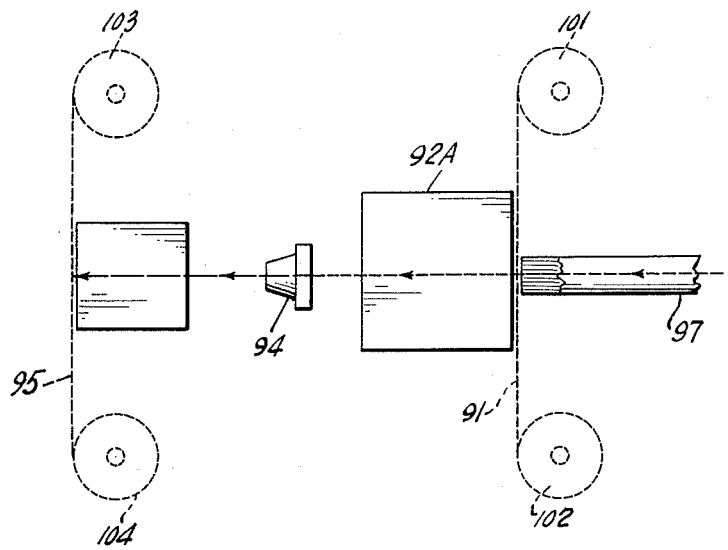
FIG. 9 is a side view of a portion of the apparatus shown in FIG. 8.

It is understood that in the projection printing embodiment shown in FIGS. 8 and 9, reducing lens 94 may be replaced by an enlarging lens whereby film 91 may have a 16 mm. width and film 95 may have a 35 mm. width. Thus, the apparatus may readily be adapted for reduction and enlargement projection printing as desired.

The transport of negative film 91 takes place between reels 101 and 102, one of which is the supply reel and the other being the take-up reel. The transport of positive film 95 takes place between reels 103 and 104, one of which is the supply reel and the other being the take-up reel (FIG. 9). Suitable film transport mechanisms, well known in the art, may be provided for each pair of reels 101, 102, and 103, 104, said mechanisms being suitably coordinated with each other to provide motion of both negative and positive film in unison.

In some embodiments, the lamp housing 21 may be positioned on the support frame of the film transport mechanism fairly close to the printing or viewing location, with suitable vibration absorbing mounting means being provided. In such a situation, the foremost advantages to be gained from the fiber optics system are the achievement of uniformity of illumination throughout the printing aperture, and the production of the requisite quality of light for obtaining the desired image contrast control, both of these conditions not being readily achieved by previous light transmission systems.

The principles of the present invention are not only useful for monochromatic film printing and viewing, but are also useful for color printing and viewing. In the latter situation, three separate cables of fiber optics would be utilized, for example, in transmitting light from corresponding discrete light sources of the requisite fundamental colors to the film printing or viewing location where the requisite integration of colors would take place by means well known in the art.

It is claimed:

1. Film printing system comprising a film printing apparatus, a film printing location in said apparatus, a light source spaced apart and mechanically isolated from said apparatus, and means for providing uniform illumination at said film printing location comprising a flexible incoherent bundle of optical fibers connected between said light source and said apparatus for transmitting light from said source to said film printing location.

2. A system according to claim 1, and further comprising a light transmitting aperture in said apparatus, said aperture being rectangular in shape to substantially conform to a picture frame of the film processed by the apparatus, and wherein the input end of said bundle connected to said light source is substantially circular in shape and the output end of said bundle at said aperture is rectangular in shape in substantial conformance with the contour of said aperture.

3. A system according to claim 1 wherein a portion of said bundle of fibers is formed into a branch bundle originating from the end of the first mentioned bundle that is connected to said light source, a photometer connected to the output end of said branch bundle, an electrical power source for said light source, and a rheostat connected in the circuit between said power source and said light source.

4. A system according to claim 1 wherein a portion of said bundle of fibers is formed into a branch bundle originating from the end of the first mentioned bundle that is connected to said light source, the output end of said branch bundle being located on said film printing apparatus in a position where it projects light upon the edge portion only of the film being processed by said apparatus.

5. A system according to claim 1, and further comprising means connected to said fiber bundle for measuring light impinging upon the input end thereof, and means connected to said light source for variably controlling the intensity of the light projected by said source upon the input end of said bundle.

6. A system according to claim 1, and further comprising at least one sprocket wheel rotatable near the output end of said bundle, said sprocket wheel engaging a pair of contiguous strips of film and passing them across said film printing location.

7. Film printing system comprising a shaft, a pair of spaced apart parallel discs mounted rotatably on said shaft, means at the periphery of at least one of said discs for transporting motion picture film, a stationary frame between said discs, a light transmitting aperture in said frame, a light-tight lamp housing spaced apart and mechanically isolated from said discs and shaft, a flexible incoherent bundle of optical fibers, the input end of said bundle being connected with a light-tight connection to said housing, the output end portion of said bundle being mounted on said stationary frame, the output end of said bundle being positioned opposite said aperture for projecting light therethrough, an electric lamp in said housing, a relay condenser positioned between said lamp and the input end of said bundle, and an electric power source for said lamp.

8. A system according to claim 7, and further comprising a potentiometer connected between said lamp and said power source, a portion of the fibers from the input end of said bundle being branched into an auxiliary bundle, a photometer connected to the output end of said auxiliary bundle, said photometer being calibrated to indicate the amount of light transmitted through said aperture, said photometer being adjustable to selectively control the amount of light to be transmitted through said aperture.

9. Film printing system according to claim 7 wherein said relay condenser transmits light from said lamp to the exposed input end of said bundle of optical fibers, said relay condenser being selectable to project a cone of light of a selected angle of entry into each of said fibers whereby the degree of diffusion of the light emerging from the output end of said fibers is controlled.

10. Film printing system according to claim 7, and further comprising a portion of the fibers from the input end of said bundle being formed into a branch bundle and receiving light from said lamp, the output end of said branch bundle being located opposite an end portion of said aperture where is projects light upon the edge portion only of the film being processed by said apparatus.

11. Film printing system comprising a first film transport mechanism for negative film, a second transport mechanism for positive film spaced apart from said first transport mechanism, a light source spaced apart and mechanically isolated from both of said transport mechanisms, a flexible incoherent bundle of optical fibers, the input end of said fiber bundle being connected to said light source, the output end of said bundle being located in a light projecting position in respect of said negative film, and a projecting lens system between said negative film and said positive film.

12. Film printing system according to claim 11, and further comprising a reducing lens positioned between said projecting lens system and said negative film.

13. Film printing system according to claim 11, and further comprising an enlarging lens positioned between said projecting lens system and said negative film.

14. Film printing or viewing system comprising a light source, an incoherent bundle of optical fibres having an input end and an output end, first means for transmitting light from said light source to the input end of said bundle of fibers, a film at the output end of said bundle of fibers, said output end projecting light upon and through said film, second means between said first means and said input end of said bundle of fibers for regulating the angle of entry of the cone of light into the input end of said fiber optics bundle whereby the degree of diffusion of light projected from the output end of said bundle of fibers upon said film is determined in order to control the contrast characteristics of said film.

15. Light transmission system for viewing or printing apparatus or the like, comprising a light source, an incoherent bundle of optical fibers having an input end and an output end, light from said source impinging upon the input end of said bundle of fiber optics, a portion of the optical fibers in said bundle being branched intermediate the input and the output ends thereof and separated into an auxiliary bundle of fiber optics, said auxiliary bundle having an output end from which it transmits light received from said light source, means at the output end of said auxiliary bundle for measuring the amount of light transmitted thereby, and means for varying the quantity of light from said light source impinging upon the input end of said first mentioned bundle of fiber optics.

16. System according to claim 15, and further comprising a power source for said light source, and a rheostat connected between said power source and said light source for regulating the quantity of light emitted by said light source.

17. Light transmission system for viewing or printing apparatus or the like, comprising a light source, a principal incoherent bundle of optical fibers having an input end and an output end, an auxiliary incoherent bundle of optical fibers having an input end and an output end, light from said source impinging upon the input ends of both of said bundles of fiber optics, means at the output end of said auxiliary bundle for measuring the amount of light transmitted thereby, and means for varying the quantity of light from said light source impinging upon the input ends of both of said bundles of optical fibers.

18. A film printing system comprising a film printing apparatus, a film printing aperture in said apparatus, a light source spaced apart from said film printing aperture, and a bundle of optical fibers positioned between said light source and said film printing aperture, said optical fibers being arranged in random array within said bundle, said bundle of fibers having an input end and an output end, light from said light source impinging upon said input end, said output end projecting light through said film printing aperture, the light projected from said output end being substantially uniformly distributed throughout said aperture.

19. Apparatus according to claim 18, and further comprising first means associated with said bundle of optical fibers for measuring the amount of light transmitted thereby, and second means associated with said light source for varying the amount of light projected thereby upon the input end of said bundle to control the amount of light transmitted by said bundle as indicated by said first means.

20. Apparatus according to claim 18, and further comprising a lens system interposed between said light source and the input end of said bundle of optical fibers, said lens system projecting a cone of light upon the input end of said bundle of optical fibers, said lens system being selected to regulate the angle of entry of said cone of light to determine the degree of diffusion of light projected from the output end of said bundle in order to control the contrast characteristics of film positioned at said printing aperture.

21. Apparatus according to claim 18, and further comprising a diaphragm interposed between said light source and the input end of said bundle of optical fibers, a variable aperture in said diaphragm through which light from said source passes toward said input end, the diameter of said aperture controlling the angle of entry of the cone of light from said source to said input end and determining the degree of diffusion of light projected from the output end of said bundle in order to control the contrast characteristics of film positioned at said printing aperture.

References Cited by the Examiner

UNITED STATES PATENTS

| | | | |
|---|---|---|---|
| 2,015,344 | 9/35 | Kosken. | |
| 2,410,104 | 10/46 | Rainey. | |
| 2,419,836 | 4/47 | Holbrook | 88—1 X |
| 2,506,672 | 5/50 | Kell et al. | 88—1 X |
| 2,881,976 | 4/59 | Greanias. | |
| 2,928,327 | 3/60 | Blackmer et al. | |
| 2,946,253 | 7/60 | Clark. | |
| 2,952,504 | 9/60 | Path | 88—1 X |
| 2,982,175 | 5/61 | Eisler | 88—1 X |
| 3,016,785 | 1/62 | Kapany | 88—1 |
| 3,029,717 | 4/62 | Hildebrandt. | |

FOREIGN PATENTS 523,097  4/55  Italy.

OTHER REFERENCES

"Concepts of Classical Optics" (Strong), published by Freeman and Co. (San Francisco) 1958—pages 562–563 relied upon.

NORTON ANSHER, *Primary Examiner.*

EMIL G. ANDERSON, *Examiner.*